US008006079B2

(12) United States Patent
Goodson et al.

(10) Patent No.: US 8,006,079 B2
(45) Date of Patent: Aug. 23, 2011

(54) SYSTEM AND METHOD FOR FAST RESTART OF A GUEST OPERATING SYSTEM IN A VIRTUAL MACHINE ENVIRONMENT

(75) Inventors: Garth Richard Goodson, Fremont, CA (US); Sai Susarla, Bangalore (IN); Kiran Srinivasan, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 756 days.

(21) Appl. No.: 12/035,485

(22) Filed: Feb. 22, 2008

(65) Prior Publication Data
US 2009/0217021 A1  Aug. 27, 2009

(51) Int. Cl.
*G06F 15/177* (2006.01)
(52) U.S. Cl. .................. 713/1; 713/2; 713/100
(58) Field of Classification Search .............. 713/1
See application file for complete search history.

(56) References Cited

U.S. PATENT DOCUMENTS

| | | | |
|---|---|---|---|
| 5,437,033 A * | 7/1995 | Inoue et al. ............ 714/10 |
| 6,671,773 B2 | 12/2003 | Kazar et al. | |
| 6,728,896 B1 | 4/2004 | Forbes et al. | |
| 6,795,966 B1 * | 9/2004 | Lim et al. ............ 718/1 |
| 7,020,800 B2 | 3/2006 | Fu et al. | |
| 7,039,828 B1 | 5/2006 | Scott | |
| 7,213,246 B1 * | 5/2007 | van Rietschote et al. ...... 718/1 |
| 7,266,637 B1 | 9/2007 | van Rietschote et al. | |
| 7,313,637 B2 | 12/2007 | Tanaka et al. | |
| 7,409,494 B2 | 8/2008 | Edwards et al. | |
| 7,529,897 B1 * | 5/2009 | Waldspurger et al. ........ 711/162 |
| 7,644,302 B2 * | 1/2010 | Kambara et al. ............... 714/6 |
| 2004/0243650 A1 * | 12/2004 | McCrory et al. ............. 707/203 |
| 2007/0074208 A1 * | 3/2007 | Ling et al. ................ 718/1 |
| 2008/0133902 A1 * | 6/2008 | Love .................... 713/2 |
| 2008/0270825 A1 | 10/2008 | Goodson et al. | |
| 2010/0122052 A1 * | 5/2010 | Waldspurger et al. ........ 711/162 |

FOREIGN PATENT DOCUMENTS
EP     1 677 199       7/2006
WO  WO 2005/101181  10/2005

OTHER PUBLICATIONS

"Notification of Transmittal of the International Search Report and the Written Opinion of the International Searching Authority, or the Declaration," International Filing Date: Apr. 28, 2008, International Application No. PCT/US2008/005442, Applicant: Network Appliance, Inc., Date of Mailing: Feb. 20, 2009, pp. 1-14.

* cited by examiner

*Primary Examiner* — Nitin C Patel
(74) *Attorney, Agent, or Firm* — Cesari and McKenna, LLP

(57) ABSTRACT

The present invention provides a system and method for fast restart of a guest operating system executing on a virtual machine operating system in a virtual machine environment. During initialization, the guest operating system saves a set of checkpoint information to persistent storage. Upon detection of an error condition during operation, the guest operating system begins a re-initialization procedure in accordance with an illustrative embodiment of the present invention. During the re-initialization procedure, the guest operating system retrieves the checkpoint information and configures itself using the retrieved information. By utilizing the retrieved information, the guest operating system avoids the need to perform lengthy configuration discovery routines, thereby shortening the re-initialization time substantially.

25 Claims, 5 Drawing Sheets

SYSTEM AND METHOD FOR FAST RESTART OF A GUEST OPERATING SYSTEM IN A VIRTUAL MACHINE ENVIRONMENT

FIELD OF THE INVENTION

The present invention relates to virtual machine systems and, more particularly, to the fast restart of a guest operating system executing in a virtual machine environment.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

A virtual machine environment illustratively includes a computer, such as a storage system, executing a virtual machine operating system along with one or more "guest" operating systems to essentially implement virtual machines on the storage system. Each guest operating system may comprise a conventional operating system, such as Microsoft Windows or Linux, etc. or may comprise a specialized operating system, such as a storage operating system. Furthermore, it may be desirable to execute a plurality of guest operating systems (or a plurality of instantiations of a guest operating system) within a virtual machine environment configured in a clustered arrangement. Thus, a cluster may comprise identical guest operating systems or may comprise a heterogeneous pairing of guest operating systems, e.g., a Microsoft Windows based guest operating system paired with a Linux based guest operating system. Typically, a substantial amount of time is required to restart a guest operating system in the event of an error condition as the guest operating system must re-probe all attached devices to determine the current configuration. The time required to re-initialize reduces overall system throughput.

SUMMARY OF THE INVENTION

The present invention overcomes the disadvantages of the prior art by providing a system and method for fast restart of a guest operating system executing on a virtual machine operating system in a virtual machine environment. Illustratively, during initialization, the guest operating system saves checkpoint information to enable future reinitializations to occur more rapidly. The checkpoint information illustratively comprises configuration information to enable the guest operating system to quickly restore itself (e.g., in the event of an error condition) to the configuration defined by the checkpoint information while obviating the need to, e.g., perform lengthy configuration discovery procedures. The checkpoint information may include, e.g., information relating to file systems, volumes, other data containers as well as physical and/or logical devices associated with the domain in which the guest operating system is executing. Upon detection of the error condition, the guest operating system begins a re-initialization procedure in accordance with an illustrative embodiment of the present invention.

During the re-initialization procedure, contents of a buffer cache of the virtual machine environment are not cleared, thereby providing a pre-loaded buffer cache for the guest operating system once the re-initialization has completed. Use of the pre-loaded cache enables the guest operating system to be fully functional in a shorter amount of time.

During the re-initialization procedure, the guest operating system determines whether its configuration has changed since the checkpoint was created. If the configuration has changed, then the guest operating system performs a conventional boot sequence. However, if the configuration has not changed, the guest operating system retrieves the checkpoint state information and configures itself using the retrieved state information. By utilizing the retrieved state information, the guest operating system avoids the need to perform lengthy configuration discovery routines, thereby shortening the re-initialization time substantially.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for fast restart of a guest operating system executing in a virtual machine operating system in a virtual machine environment. Illustratively, during initialization, the guest operating system saves a set of checkpoint information to persistent storage. During a subsequent re-initialization procedure due to, e.g., an error condition, the guest operating system determines whether its configuration has changed since the checkpoint was created. If the configuration has changed, then the guest operating system then performs a conventional boot sequence not using the principles of the present invention. However, if the configuration has not changed, then the guest operating system retrieves the checkpoint state information and configures itself using the retrieved state information. By utilizing the retrieved state information, the guest operating system avoids the need to perform lengthy configuration discovery routines, thereby shortening the re-initialization time substantially.

A. Storage System

Figure 1:
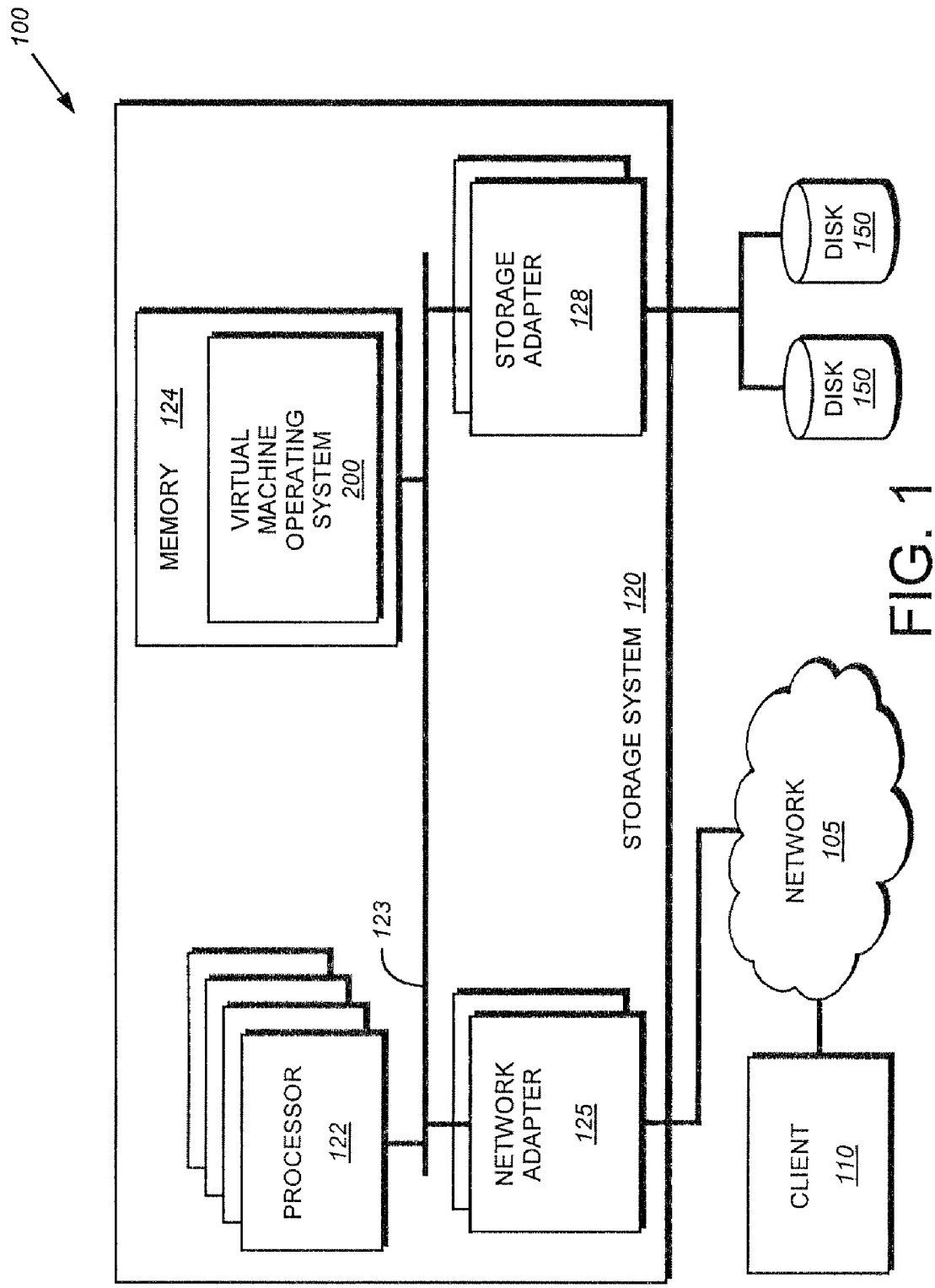
FIG. 1 is a schematic block diagram of an exemplary storage system environment in accordance with an illustrative embodiment of the present invention.

FIG. 1 is a schematic block diagram of a storage system 120 that illustratively comprises a plurality of processors 122, a memory 124, a network adapter 125 and a storage adapter 128 interconnected by a system bus 123. Illustratively, the storage system 120 may comprise a multi-processor computer that executes a virtual machine operating system 200, such as an illustrative Xen virtual machine hypervisor, VMWare ESX, IBM's LPAR, etc. It should be noted that while this description is written in terms of the Xen system, other virtual machine operating systems may be utilized in accordance with alternate embodiments of the present invention. As multi-processor computers or storage systems increase in processing power, it makes economic sense to execute a number of guest operating systems (or instantiations of a guest operating system) of the virtual machine operating system 200 instead of acquiring a number of physical hardware systems. As noted above, a cluster may comprise identical guest operating systems or may comprise a heterogeneous pairing of guest operating systems, e.g., a Microsoft Windows based guest operating system paired with a Linux based guest operating system. By utilizing a plurality of guest operating systems, appropriate redundancy is maintained for software failures; however, should the physical hardware system fail, all guest operating systems will also fail. To counteract such a failure, the storage system 120 may be interconnected with one or more storage systems as a cluster within a physical hardware arrangement. Furthermore, the virtual machine operating system 200 may be configured to enable guest operating system migration among the clustered storage systems.

The memory 124 illustratively comprises storage locations that are addressable by the processors and adapters for storing software program code and data structures associated with the present invention. The processor and adapters may, in turn, comprise processing elements and/or logic circuitry configured to execute the software code and manipulate the data structures.

The network adapter 125 comprises a plurality of ports adapted to couple the storage system 120 to one or more clients 110 over a network 105 embodied as point-to-point links, wide area networks, virtual private networks implemented over a public network (Internet) or a shared local area network. The network adapter 125 thus may comprise the mechanical, electrical and signaling circuitry needed to connect the storage system 120 to the network 105. Illustratively, the computer network 105 may be further embodied as an Ethernet network or a Fibre Channel (FC) network. Each client 110 may communicate with the storage system over network 105 by exchanging discrete frames or packets of data according to pre-defined protocols, such as TCP/IP.

The clients 110 may be general-purpose computers configured to interact with the system 120 in accordance with a client/server model of information delivery. That is, each client may request the services of the storage system, and the system may return the results of the services requested by the client, by exchanging packets over the network 105. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the virtual machine operating system 200 executing on the storage system 120 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage devices, such as disks 150. The storage adapter comprises a plurality of ports having input/output (I/O) interface circuitry that couples to the disks over an I/O interconnect arrangement, such as a conventional high-performance, FC link topology.

B. Virtual Machine Operating System

Figure 2:
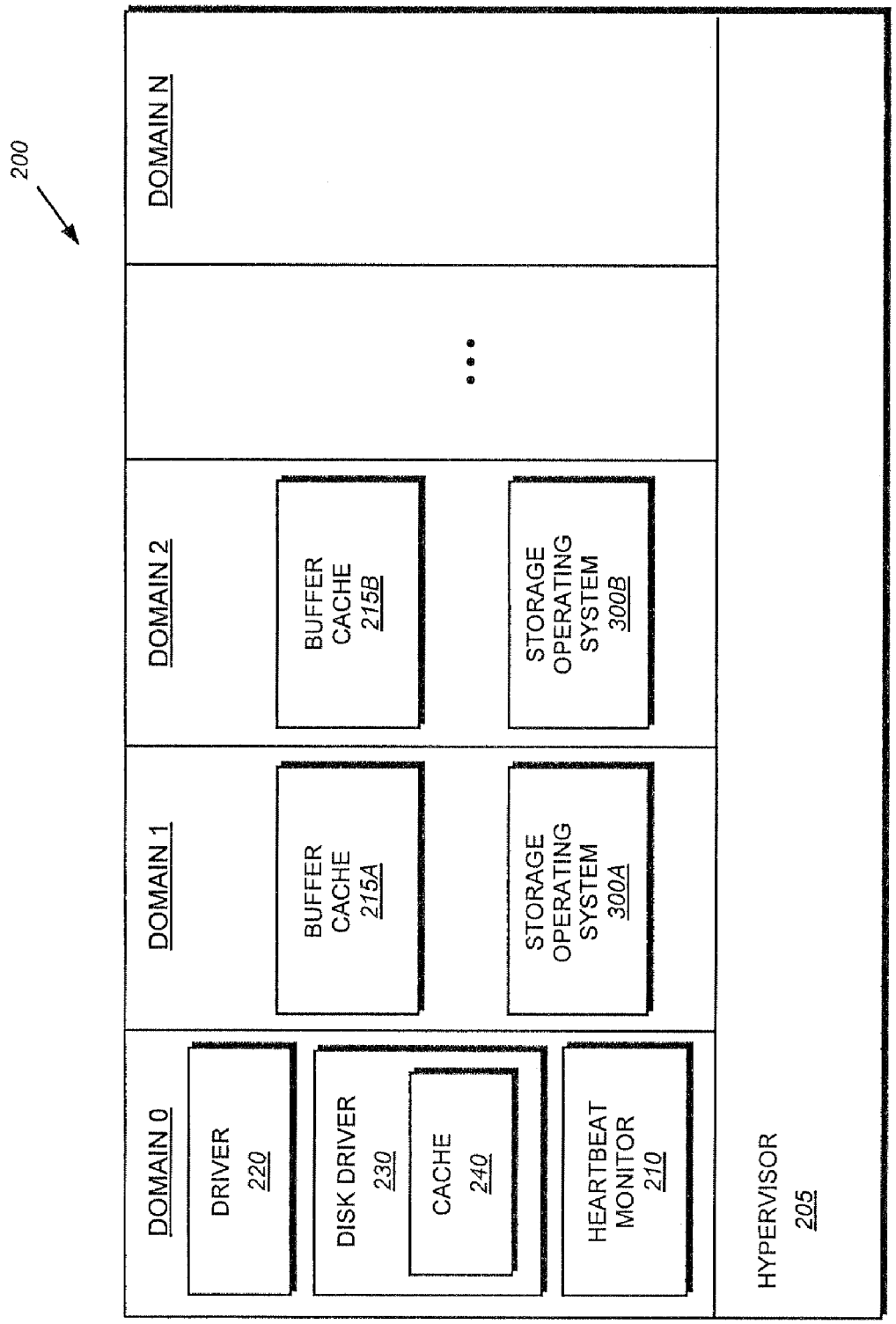
FIG. 2 is a schematic block diagram of an exemplary virtual machine operating system in accordance with an illustrative embodiment of the present invention.

FIG. 2 is a schematic diagram of an exemplary virtual machine operating system 200 in accordance with an illustrative embodiment of the present invention. As noted, the virtual machine operating system 200 illustratively comprises the Xen virtual machine operating system. However, it should be noted that the principles of the present invention may be utilized in other virtual machine operating systems. Thus, the principles of the present invention may be utilized with virtual machine operating systems available from Microsoft, VMware or the like. As such the description of the Xen system should be taken as exemplary only. Illustratively, the virtual machine operating system 200 comprises a hypervisor module 205 that masks low-level hardware operations from the guest operating systems executing within various domains of the virtual machine operating system 200.

Illustratively disposed over the hypervisor module 205 is a plurality of domains, for example, Domains 0, 1, 2, etc. As used herein, a hypervisor is a virtualization platform that permits a plurality of guest operating systems to execute on a computer at the same time. Each domain is representative of a virtual machine within which a guest operating system executes. In the illustrative embodiment of the Xen operating system, Domain 0 provides administrator functionality. Domain 0 illustratively executes a Linux based kernel along with one or more administrative modules, such as a heartbeat monitor 210. The heartbeat monitor 210 illustratively monitors the status of various guest operating systems, such as storage operating systems 300A,B, which may be organized in a cluster configuration, i.e., configured so that should one fail, the surviving storage operating system will take over processing data access requests directed to the failed system. In response to detecting a failure in a guest operating system, the heartbeat monitor will alert the surviving guest operating system to ensure that appropriate failover operations occur. The heartbeat monitor may alert the surviving guest operating system using, e.g., a remote procedure call to the guest operating system. The heartbeat monitor may monitor the status of the guest operating systems by, e.g., monitoring a routine signal sent by each operating system. Should the guest operating system fail to send the signal, the heartbeat monitor may assume an error condition has occurred.

Domain 0 may also include, for example, a plurality of software drivers 220 adapted to interface with various hardware components including, for example, the network adapters 125, storage adapters 128, etc. The drivers 220 illustratively provide an interface for I/O operations issued by the guest operating systems. Furthermore, in an illustrative embodiment of the present invention, Domain 0 includes one or more disk drivers 230 that are utilized for performing I/O operations to storage devices, such as disks 150 associated with storage system 120. In accordance with an illustrative embodiment of the present invention, disk drivers 230 interact (cooperate) with a portion of memory 124 organized as a cache 240. Notably, in the event of the re-initialization of a guest operating system, the contents of the cache 240 are not cleared. Thus, when the guest operating system completes its re-initialization, the cache 240 is in the same state as prior to the error condition. In an illustrative failover embodiment, where a surviving guest operating system takes over control of devices previously controlled by a failed guest operating system, the surviving guest operating system may utilize the cache 240 to interact with the drivers 230, which are external to the domain of the failed guest operating system.

Furthermore, in embodiments where device configuration is maintained external to the domain in which a guest operating system is executing, the guest operating system is able to re-initialize faster as the device does not need to be reconfigured. Improved performance is possible when the guest operating system tracks the devices to which it is attached and any data structures necessary to quickly reattach the devices. Such information may be retained in a checkpoint, see further below, to enable fast restarts of the guest operating system.

Similarly, in illustrative embodiments utilizing a failover technique, the checkpoint and/or the shared buffer cache may be utilized by the surviving partner guest operating system to speed accesses to date. In certain illustrative embodiments, the time required to perform the failover operation. In such embodiments, failover operations may not occur as the time required to perform the failover operation exceeds the time needed to perform a restart of the guest operating system.

In the example shown in FIG. 2, Domain 1 and Domain 2 each execute a storage operating system 300. Each storage operating system 300 illustratively interacts/cooperates with another portion of memory organized as a buffer cache 215A, B that is utilized to cache read/write data before serving it to a client and/or committing the data to disk or other persistent storage. In accordance with an illustrative embodiment of the present invention, the contents of the buffer cache are also not cleared when a guest operating system, such as storage operating system, re-initializes in response to detection of an error condition. By not clearing the buffer cache, the guest operating system reinitializes with a pre-loaded buffer cache, which may expedite the operating system's ability to become fully functional. In accordance with an alternative embodiment of the present invention, a plurality of domains may share a single buffer cache. For example, the virtual machine operating system 200 may include a single buffer cache sharable by all domains. In such embodiments, the hypervisor 205 may implement virtual memory protection features to share portions of the buffer cache among the domains. For example, a portion of the buffer cache may be marked as read/write accessible to a certain domain, while other portions are maintained as read only.

An illustrative clustered configuration typically includes the capability that if one of the guest operating systems (instantiations) suffers an error condition or otherwise fails, the surviving instantiation of the guest operating system assumes the identity of the failed (instantiation of the) operating system to thereby enable continued processing of requests directed to the failed operating system (instantiation). As used herein, an error condition is any irregular state that the guest operating system encounters that necessitates a restart to clear/correct. Furthermore, certain error conditions may not require a restart to correct, but a restart may be user-initiated to correct the error condition. Examples of error conditions include, software failures, bugs, over/underflows, etc. Typically, the failed operating system re-initializes (restarts) in order to clear the error condition. While the failed operating system is restarting, the surviving operating system is servicing both requests directed to the failed operating system and requests directed to the surviving operating system. The present invention enables a faster restart of a failed guest operating system.

C. Storage Operating System

In accordance with an illustrative embodiment of the present invention, the guest operating systems 300 are implemented as storage operating systems. However, it should be noted that the principles of the present invention may be utilized with other types of guest operating systems organized in a cluster arrangement. As such, the description of storage operating systems being utilized as the guest operating systems should be taken as exemplary only. Each storage operating system 300 illustratively implements a write-anywhere file system that cooperates with one or more virtualization modules to "virtualize" the storage space provided by storage devices, such as disks. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of named data containers, such as blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
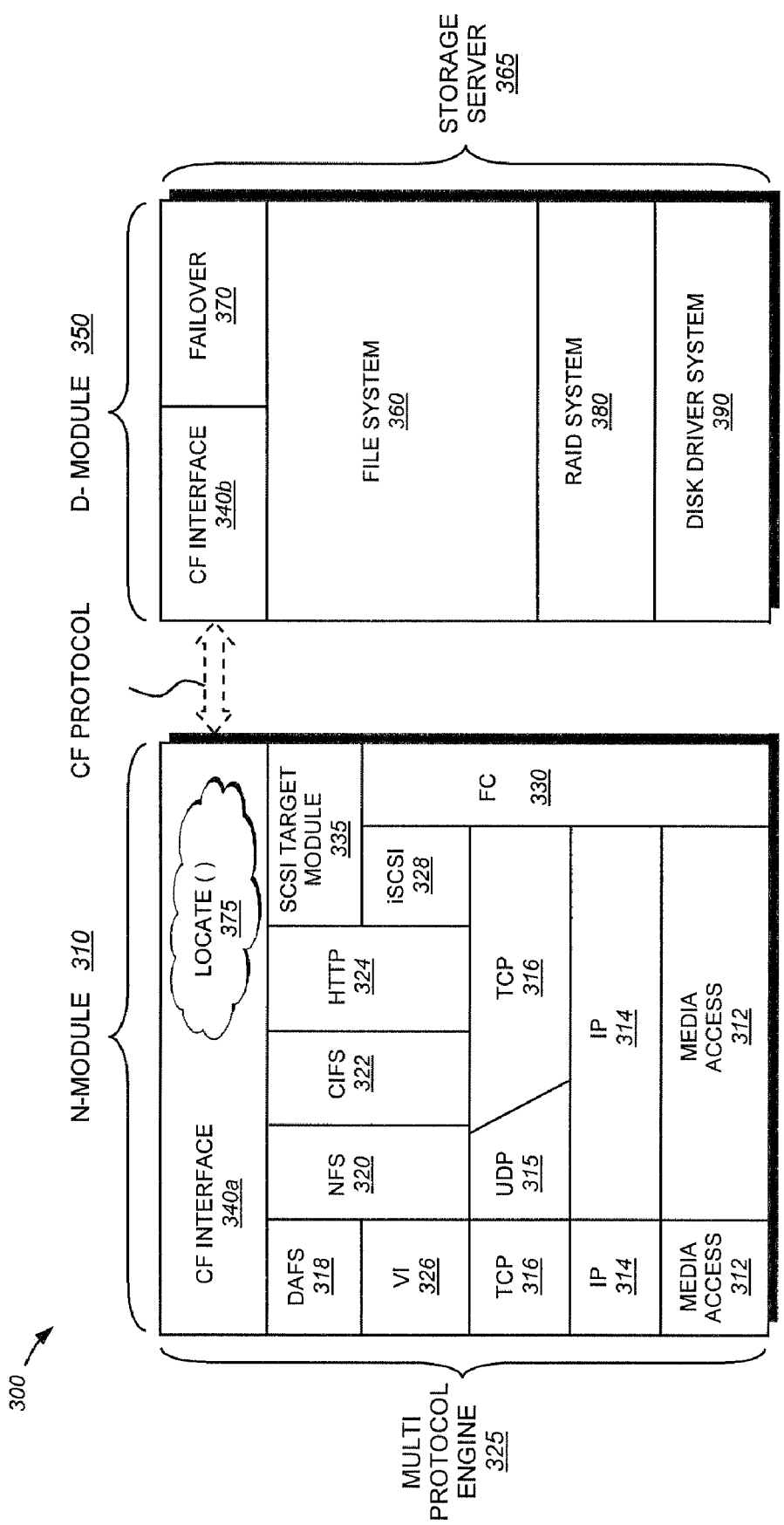
FIG. 3 is a schematic block diagram of an exemplary storage operating system that may be utilized as a guest operating system in a virtual machine environment in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the storage system using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system 120.

In addition, the storage operating system includes a series of software layers organized to form a storage server 365 that provides data paths for accessing information stored on the disks 150 of the storage system 120. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The storage operating system 300 also includes a failover monitor 370 that implements failover functionality in accordance with alternative embodiments of the present invention. To that end, the failover monitor 370 may send routine heartbeat signals to the heartbeat monitor 210 to alert the monitor that the storage (i.e. guest) operating system 300 is functioning normally. Conversely, upon detecting a failure of a guest operating system 300, the heartbeat monitor 210 alerts the failover monitor 370 of the surviving guest operating system of the failure. The failover monitor may then effectuate failover operations including, e.g., assumption of the identity of the failed guest operating system, etc.

The file system 360 implements a virtualization system of the storage/guest operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown) in response to a user (system administrator) issuing commands to the guest operating system 300. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fs info block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the network 105 and onto storage system 120 where it is received at the network adapter 125. An appropriate network driver 220 of the virtual machine operating system 200 processes the packet and forwards it to the appropriate guest operating system 300. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 150 if it is not resident "in core", i.e., in memory 124. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 150 and loads the requested data block(s) in memory for processing by the node. Upon completion of the request, the guest operating system returns a reply to the driver 220, which forwards the reply over the network adapter 125 to the client 110 over the network 105.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC).

As used herein, the term "storage operating system" generally refers to the computer-executable code operable on a computer to perform a storage function that manages data access and may, in the case of a guest operating system 300, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the guest operating system 300 to service one or more disks 150. In addition, the multi-protocol engine 325 is embodied as N-module 310 to (i) perform protocol termination with respect to a client issuing incoming data access request packets over the network 105, as well as (ii) redirect those data access requests to any storage server 365 of any guest operating system executing on the virtual machine operating system. Moreover, the N-module 310 and D-module 350 cooperate to provide a highly-scalable, distributed storage system architecture. To that end, each module includes a cluster fabric (CF) interface module 340*a,b* adapted to implement communication among the modules, including D-module-to-D-module communication.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-module 350. Notably, the CF interface modules 340 cooperate to provide a single file system image across all D-modules 350. Thus, any network port of an N-module that receives a client request can access any data container within the single file system image located on any D-module 350.

Further to the illustrative embodiment, the N-module 310 and D-module 350 are implemented as separately-scheduled processes of guest operating system 300; however, in an alternate embodiment, the modules may be implemented as pieces of code within a single operating system process. Communication between an N-module and D-module is thus illustratively effected through the use of message passing between the modules. A known message-passing mechanism provided by the guest operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of the virtual machine operating system 200. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same domain or (ii) a remote procedure call (RPC) when communicating the command to a D-module residing on a different domain of the virtual machine operating system 200. In either case, the CF decoder of CF interface 340*b* on D-module 350 de-encapsulates the CF message and processes the file system command.

E. Fast Restart of Guest Operating Systems

The present invention provides a system and method for fast restart of a guest operating system executing on a virtual machine operating system in a virtual machine environment. Illustratively, during initialization, the guest operating system saves checkpoint information. The checkpoint information illustratively comprises configuration information to enable the guest operating system to quickly restore itself (e.g., in the event of an error condition) to the configuration defined by the checkpoint information while obviating the need to, e.g., perform lengthy configuration discovery procedures. Upon detection of the error condition, the guest operating system begins a re-initialization procedure in accordance with an illustrative embodiment of the present invention.

During the re-initialization procedure, contents of a buffer cache of the virtual machine environment are not cleared, thereby providing a pre-loaded buffer cache for the guest operating system once the re-initialization has completed. Use of the pre-loaded cache enables the guest operating system to be fully functional in a shorter amount of time. During the re-initialization procedure, the guest operating system determines whether its configuration has changed since the checkpoint was created. Illustratively, the configuration identifies the list of devices associated with the guest operating system, how those devices are organized, e.g., in a RAID array, network adapters associated with the guest operating system, etc. If the configuration has changed, then the guest operating system performs a conventional boot sequence. However, if the configuration has not changed, the guest operating system retrieves the checkpoint state information and configures itself using the retrieved state information. By utilizing the retrieved state information, the guest operating system avoids the need to perform lengthy configuration discovery routines, thereby shortening the re-initialization time substantially.

Figure 4:
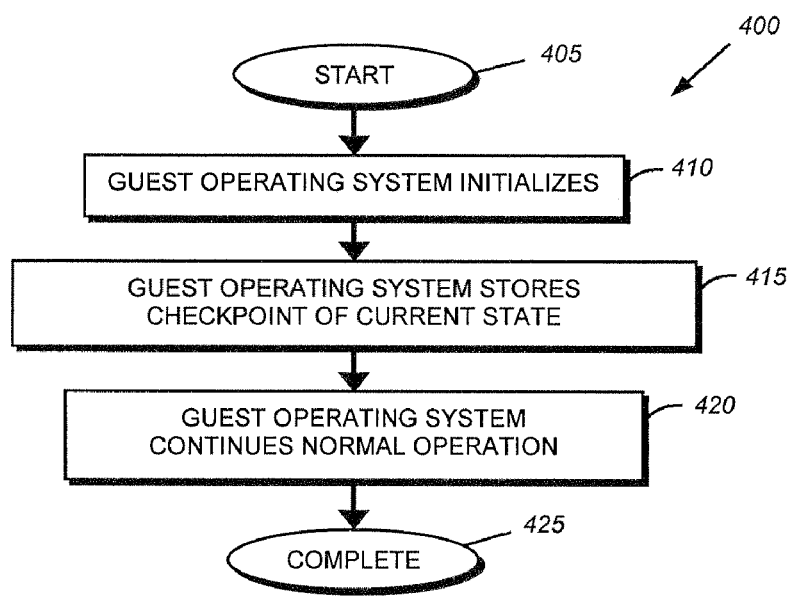
FIG. 4 is a flowchart detailing the steps of a procedure for storing a checkpoint for a guest operating system in accordance with an illustrative embodiment of the present invention.

FIG. 4 is a flowchart detailing steps of a procedure 400 for storing a checkpoint for a guest operating system in accordance with an illustrative embodiment of the present invention. The procedure 400 begins in step 405 and continues to step 410 where the guest operating system initializes due to, e.g., a reboot procedure or a power cycle. During the initialization procedure, the guest operating system stores a checkpoint of its current state in step 415. This checkpoint may include, e.g., device configuration information, volume (or other data container) configurations, etc. The checkpoint may include data structures that describe data containers, such as volumes, file systems, etc. In alternative embodiments, the checkpoint may include information relating to physical devices associated with the domain.

The checkpoint may be stored in, e.g., a predefined area of a root volume associated with the guest operating system. In an alternate embodiment, the virtual machine operating system may provide functionality for the guest operating system to persistently store the checkpoint information. In such embodiments, the virtual machine operating system may store the checkpoint information in a storage space reserved by the virtual machine operating system. In an alternative embodiment, the checkpoint may be stored in memory. In such embodiments, the checkpoint may be generated upon an initialization of the physical system. Reinitializations of the guest operating system do not require generation of new checkpoints unless the configuration information changes or the entire physical system reinitializes.

Once the checkpoint information has been stored, the guest operating system continues normal operation and, e.g., completes a conventional initialization process. The procedure 400 then completes in step 425.

Figure 5:
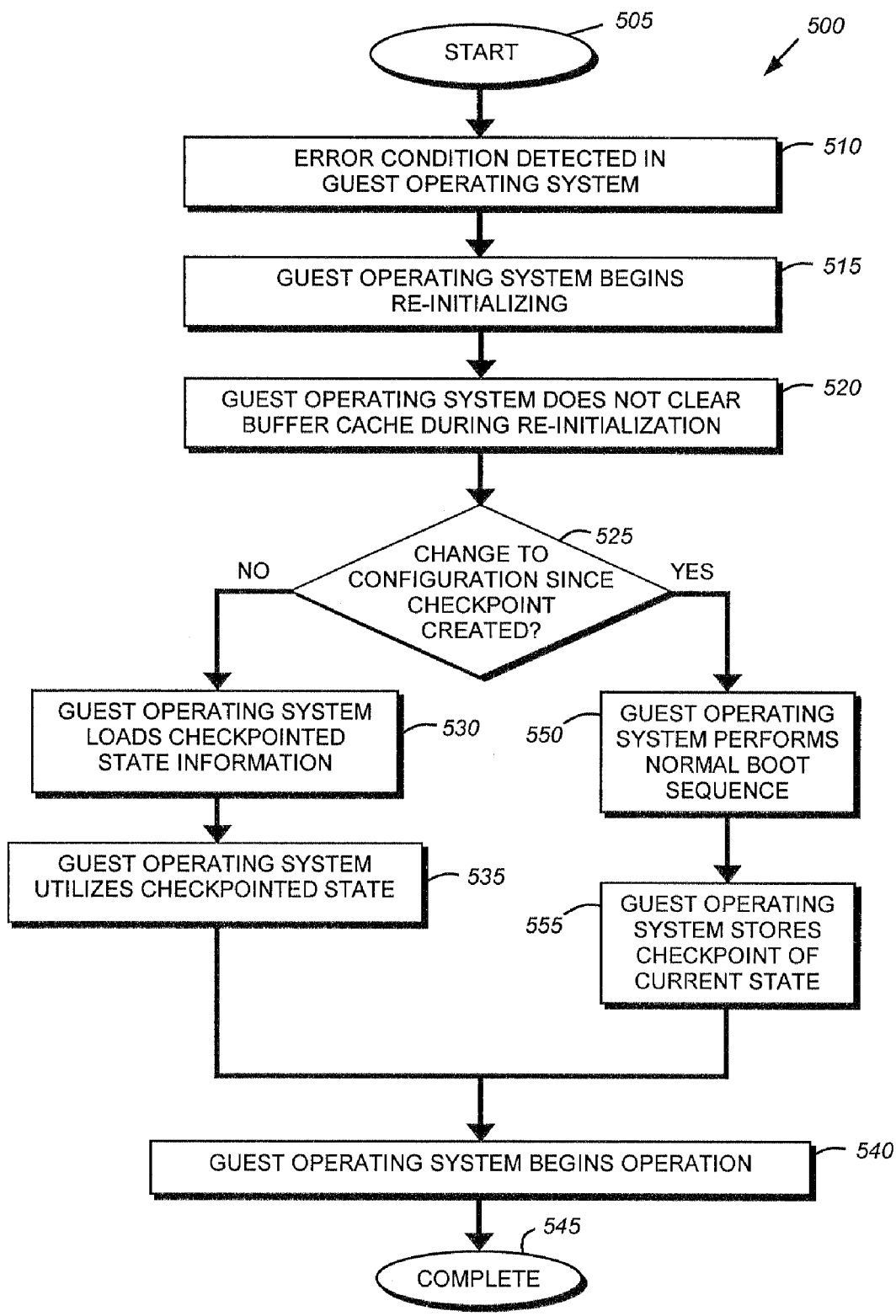
FIG. 5 is a flowchart detailing the steps of a procedure for performing a fast restart of a guest operating system in accordance with an illustrative embodiment of the present invention.

FIG. 5 is a flow chart illustrating the steps of a procedure 500 for performing a fast restart of a guest operating system in accordance with an illustrative embodiment of the present invention. The procedure 500 begins in step 505 and continues to step 510 where an error is detected in the guest operating system. The error may be detected by e.g., the heart beat monitor or by the guest operating system itself. In an alternate embodiment, the error may by detected by an administrator, who then executes a command to restart the guest operating system. In response to the detection of the error, the guest operating system begins re-initializing in step 515. As noted, performing a conventional restart operation may take on the order of minutes due to, e.g., the need to rebuild configuration information, etc. By utilizing the principles of the present invention, this time may be substantially reduced. In one illustrative embodiment of the present invention, the guest operating system does not clear its buffer cache during the restart. By not clearing the buffer cache, the guest operating system will restart with the contents of its buffer cache "preloaded" and will be able to serve data access requests faster as a result of, e.g., an increase number of a cache hits due to the buffer cache containing recently accessed data. As the guest operating system is executing in a virtual machine environment, the memory comprising the cache may be protected and not cleared during the re-initialization.

Once it has begun to re-initialize, the guest operating system determines whether there have been any changes to its configuration since the checkpoint was created, e.g., creating of a new volume, addition of a RAID group, etc. If the configuration has changed, then the stored checkpoint is stale and the procedure branches to step 550 where the guest operating system performs a conventional, i.e., non-checkpoint, boot sequence, with the concomitant time delay until the guest operating system is ready to process requests directed thereto. In alternative embodiments, whenever configuration information is modified, the checkpoint may be marked as stale, thereby enabling a faster determination of whether the checkpoint is stale. Once the guest operating system completes its conventional boot operation in step 550, the guest operating system stores a checkpoint of its current state in step 555. The procedure 500 continues to step 540 where the guest operating system begins operation by, e.g., processing data access operations directed to it. The procedure then completes in step 545.

However, if in step 525 it is determined that the configuration has not changed since the checkpoint was created, then the procedure branches to step 530 where the guest operating system loads the checkpoint state information. This may occur by, e.g., retrieving the checkpoint state information from a root volume, requesting the virtual machine operating system to retrieve the checkpoint, etc. Once the checkpoint state information has been loaded, the guest operating system utilizes the checkpoint state information to configure itself instead of performing various discovery routines. In an alternative embodiment of the present invention, if part of the configuration has been modified, a portion of the old checkpoint may be utilized, with only that portion of the changed configuration requiring a conventional initialization. Once configured, the guest operating system then begins operation in step 540 by, e.g., servicing requests directed to it, etc.

It should be noted that in alternative embodiments of the present invention, various changes to the checkpoint state information may occur during execution of the guest operating system. For example, if configuration information is modified by, e.g., creation of a new volume, the stored checkpoint state information may be modified to incorporate the modified state information. In such embodiments, the checkpoint is maintained with the current configuration to enable faster restarts, i.e., the only time the checkpoint is stale is if an error condition occurs during a configuration change prior to the checkpoint being updated. Furthermore, as noted above, in alternative embodiments, only a portion of a checkpoint may be invalidated, e.g., the identify of the storage devices associated with the guest operating system, while other portions are not invalidated, e.g., network adapter information. In such embodiments, certain devices may need to be probed and/or initialized, while the remainder of the configuration may be utilized from the stored checkpoint.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Furthermore, it should be noted that while the present invention has been written in terms of two member clusters, the principles of the present invention may be utilized in n-way clusters. As such, the description of two member clusters should be taken as exemplary only. Therefore, it is the object of the appended claims to cover all such variations and modifications as come within the true spirit and scope of the invention.

What is claimed is:

1. A method of re-initializing a guest operating system executing on a virtual machine operating system, the method comprising:
    saving in a memory of a computer, during initialization of the guest operating system, checkpoint information associated with a domain in which the guest operating system is executing;
    detecting an error condition in the guest operating system;
    initiating a re-initialization procedure of the guest operating system;
    in response to initiating the re-initialization procedure of the guest operating system, determining whether a configuration of the guest operating system has changed since the checkpoint information associated with the domain in which the guest operating system is executing was saved;
    in response to determining that the configuration has not changed:
    (a) loading the saved checkpoint information; and
    (b) utilizing the saved checkpoint information to configure the guest operating system.

2. The method of claim 1 wherein a buffer cache associated with the guest operating system is not cleared during the re-initialization procedure.

3. The method of claim 1 further comprising in response to determining that the configuration has changed, performing a conventional re-initialization.

4. The method of claim 1 wherein the checkpoint information comprises a list of data containers serviced by the guest operating system.

5. The method of claim 1 wherein the checkpoint information comprises a list of storage devices utilized by the guest operating system.

6. The method of claim 1 wherein the guest operating system comprises a storage operating system.

7. The method of claim 1 wherein, during the re-initializing procedure, a surviving guest operating system services requests directed to the guest operating system.

8. The method of claim 1 wherein saving the checkpoint information comprises storing the checkpoint information on a predefined location on a storage device.

9. The method of claim 1 wherein saving the checkpoint information comprises invoking the virtual machine operating system to store the checkpoint information.

10. A non-transitory computer readable medium containing executable program instructions executed by a processor, comprising:
    saving in a memory of a computer, during initialization of a guest operating system, checkpoint information associated with a domain in which the guest operating system is executing;
    detecting an error condition in the guest operating system;
    initiating a re-initialization procedure of the guest operating system;
    in response to initiating the re-initialization procedure of the guest operating system, determining whether a configuration of the guest operating system has changed since the checkpoint information associated with the domain in which the guest operating system is executing was saved;

in response to determining that the configuration has not changed:
(a) loading the saved checkpoint information; and
(b) utilizing the saved checkpoint information to configure the guest operating system.

11. A system comprising:
a virtual machine operating system executing a guest operating system within a domain of the virtual machine operating system, the guest operating system configured to store in a memory of a computer checkpoint information associated with the domain in which the guest operating system is executing, the virtual machine operating system to utilize, during a re-initialization procedure, the stored checkpoint information associated with the domain in which the guest operating system is executing to configure the guest operating system in response to a determination that a configuration of the guest operating system has not changed since the checkpoint information associated with the domain in which the guest operating system is executing was saved.

12. The system of claim 11 wherein the guest operating system comprises a storage operating system.

13. The system of claim 11 wherein the checkpoint information comprises a list of storage devices associated with the guest operating system.

14. The system of claim 11 wherein the checkpoint information comprises a list of data containers associated with the guest operating system.

15. The system of claim 11 wherein the virtual machine operating system comprises a storage device driver, the storage device driver cooperating with a cache.

16. The system of claim 15 wherein the cache is not cleared during the re-initialization procedure.

17. The system of claim 11 wherein the re-initialization procedure is initiated in response to an error condition of the guest operating system.

18. The system of claim 11 wherein the checkpoint information is stored in a predefined location of a storage device.

19. The system of claim 11 wherein the checkpoint information is stored by the virtual machine operating system.

20. A method for a fast restart of a guest operating system executing on a virtual machine operating system, the method comprising:

initiating a re-initialization procedure of the guest operating system;

loading a set of saved checkpoint information saved in a memory of a computer and associated with a domain in which the guest operating system is executing; and utilizing the saved checkpoint information associated with the domain in which the guest operating system is executing to configure the guest operating system in response to a determination that a configuration has not changed since the checkpoint information associated with the domain in which the guest operating system is executing was saved, whereby the guest operating is not configured using a lengthy configuration detection routine.

21. The method of claim 20 further comprising not clearing a buffer cache to thereby enable faster utilization of data stored in the buffer cache once the guest operating system is configured using the saved checkpoint information.

22. The method of claim 20 wherein the re-initialization procedure is initiated in response to an error condition of the guest operating system.

23. A system for providing a fast restart of a guest operating system, the system comprising:
a virtual machine operating system executing the guest operating system within a domain of the virtual machine operating system, the guest operating system configured to store in a memory of a computer, during an initialization, checkpoint information associated with the domain in which the guest operating system is executing, the virtual machine operating system to utilize, during a re-initialization procedure, the stored checkpoint information associated with the domain in which the guest operating system is executing to configure the guest operating system, wherein the stored checkpoint information associated with the domain in which the guest operating system is executing is used in place of a configuration identification procedure.

24. The system of claim 23 wherein the configuration identification procedure is utilized to initially configure the guest operating system during an initial initialization.

25. The system of claim 23 wherein the virtual machine operating system further comprises a cache utilized by the guest operating system, wherein the cache is not cleared during the re-initialization procedure to provide a faster restart of the guest operating system.

* * * * *